Oct. 22, 1963  L. COOK  3,107,518
GAS SPECIFIC GRAVITY MEASURE
Filed Jan. 18, 1962  4 Sheets-Sheet 1
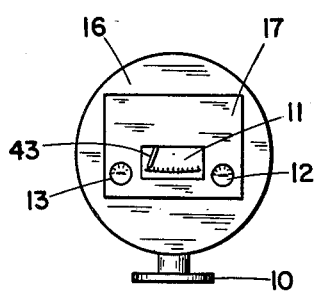
FIG. I
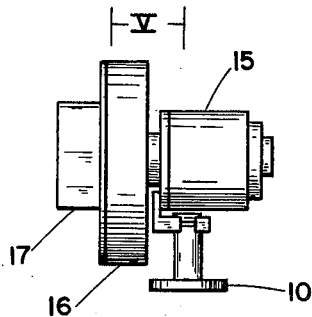
FIG. II
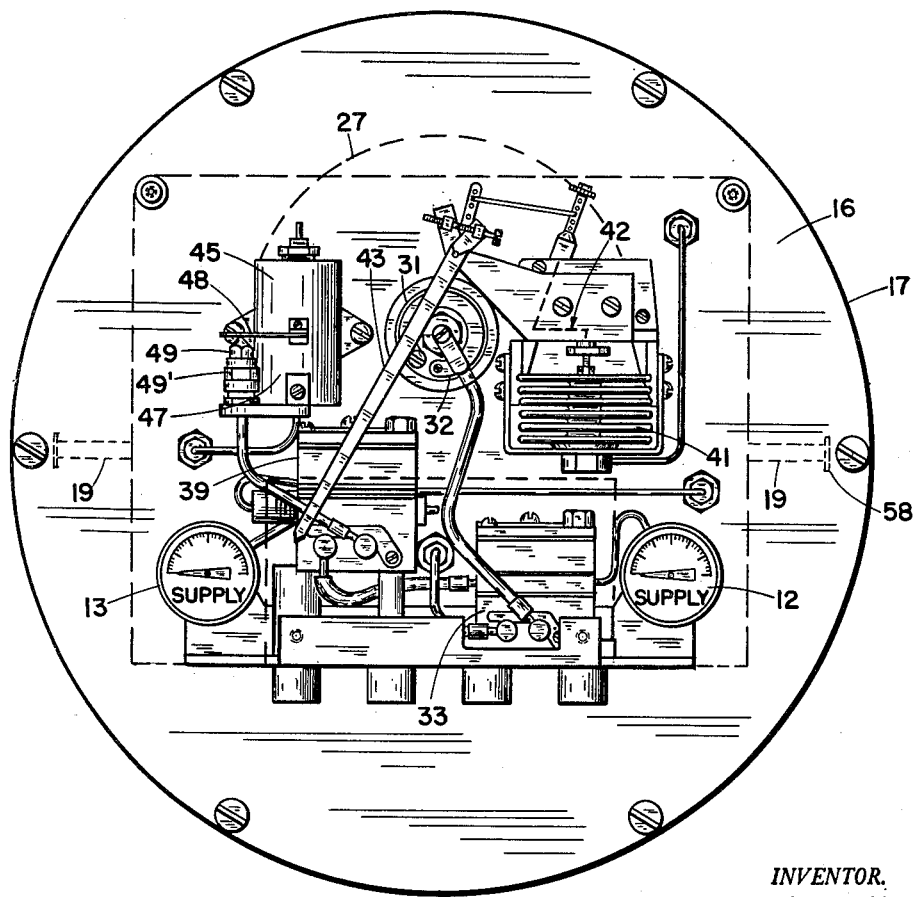
FIG. III
INVENTOR.
LYMAN COOK
BY
Lawrence H. Patton
AGENT Oct. 22, 1963
L. COOK
3,107,518
GAS SPECIFIC GRAVITY MEASURE
Filed Jan. 18, 1962
4 Sheets-Sheet 2
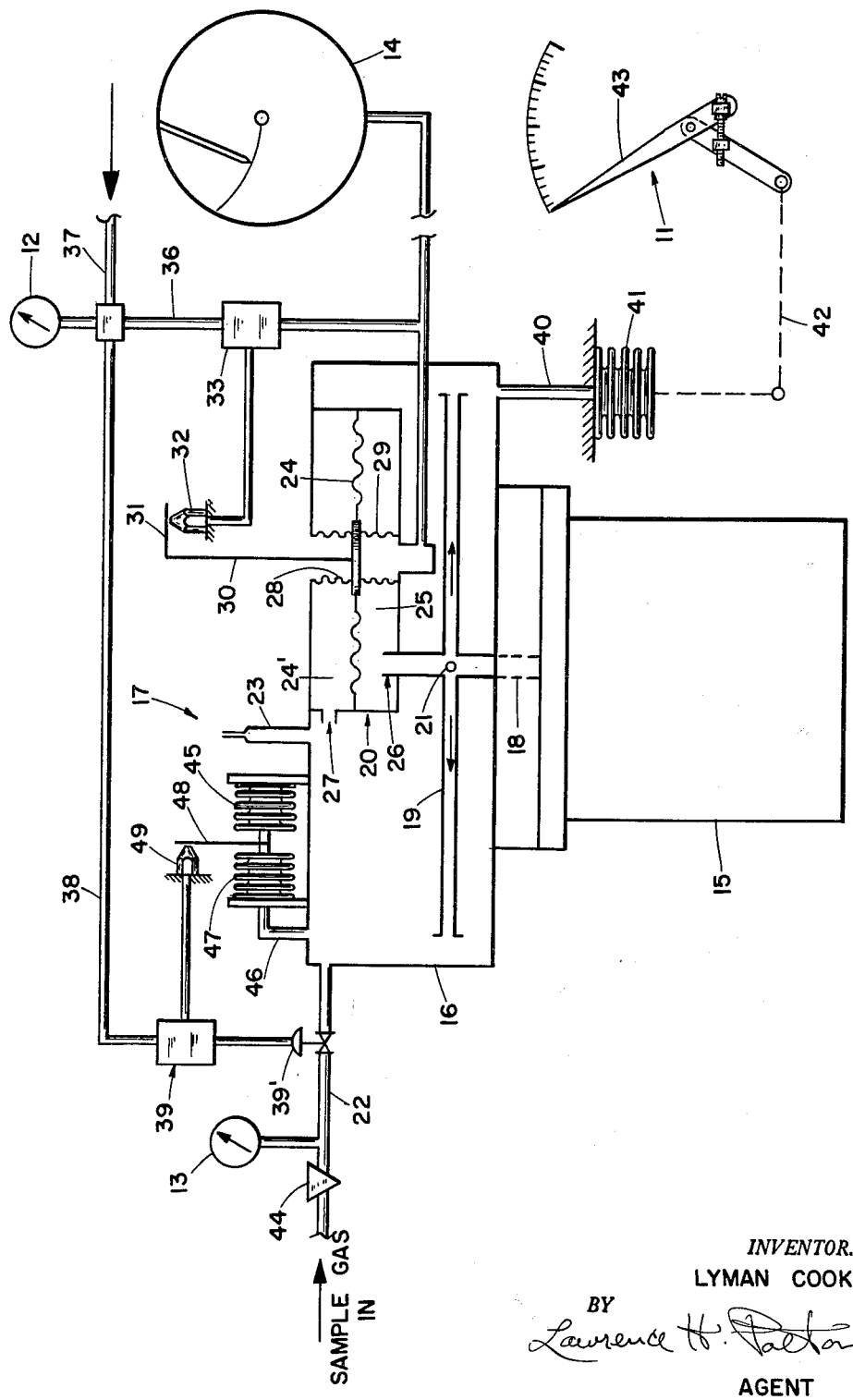
FIG. IV
INVENTOR.
LYMAN COOK
BY
Lawrence H. Patton
AGENT Oct. 22, 1963 L. COOK 3,107,518
GAS SPECIFIC GRAVITY MEASURE
Filed Jan. 18, 1962 4 Sheets-Sheet 3
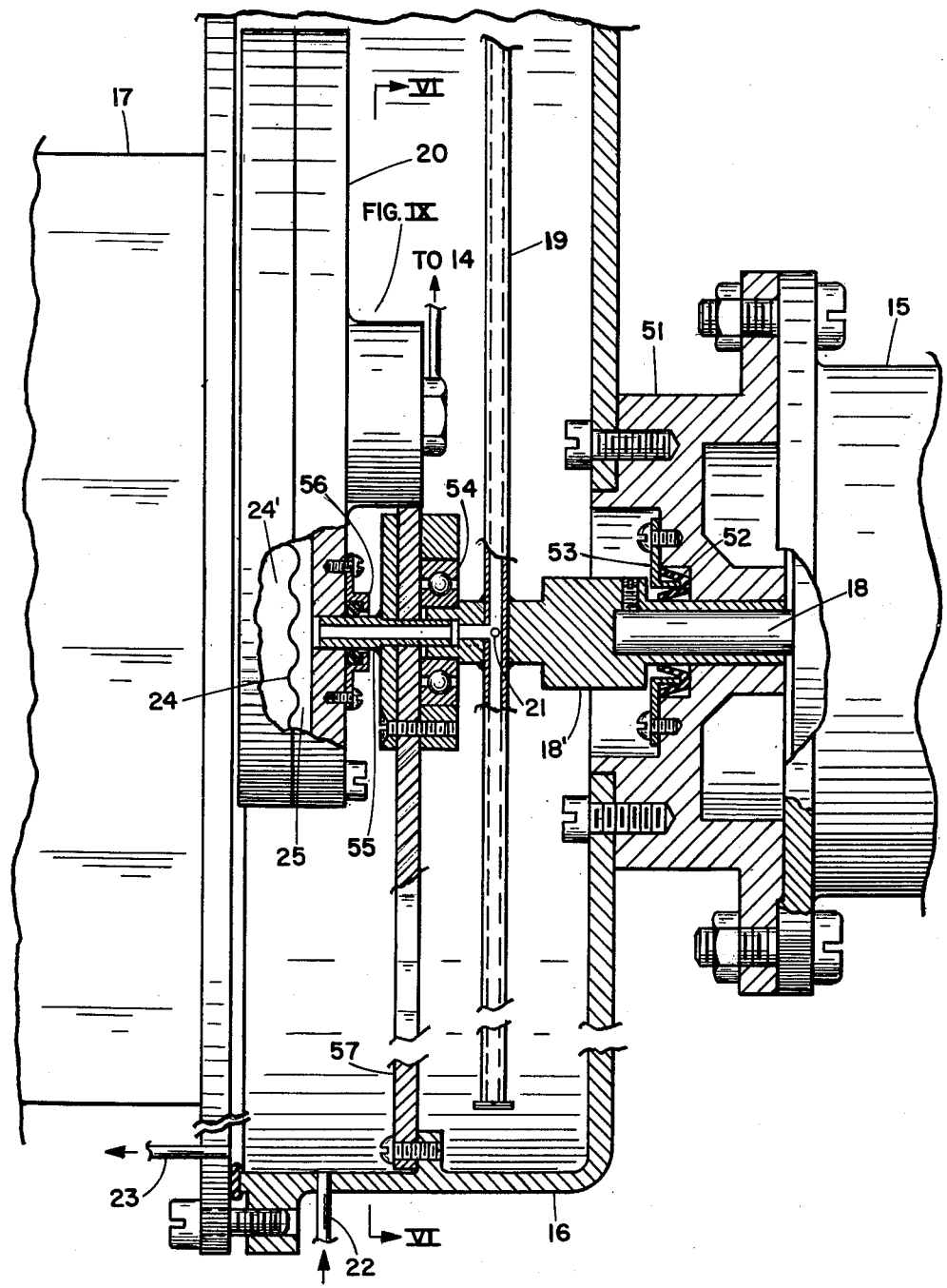
FIG. V
INVENTOR.
LYMAN COOK
BY
Lawrence H. Polton
AGENT Oct. 22, 1963
L. COOK
3,107,518
GAS SPECIFIC GRAVITY MEASURE
Filed Jan. 18, 1962
4 Sheets-Sheet 4
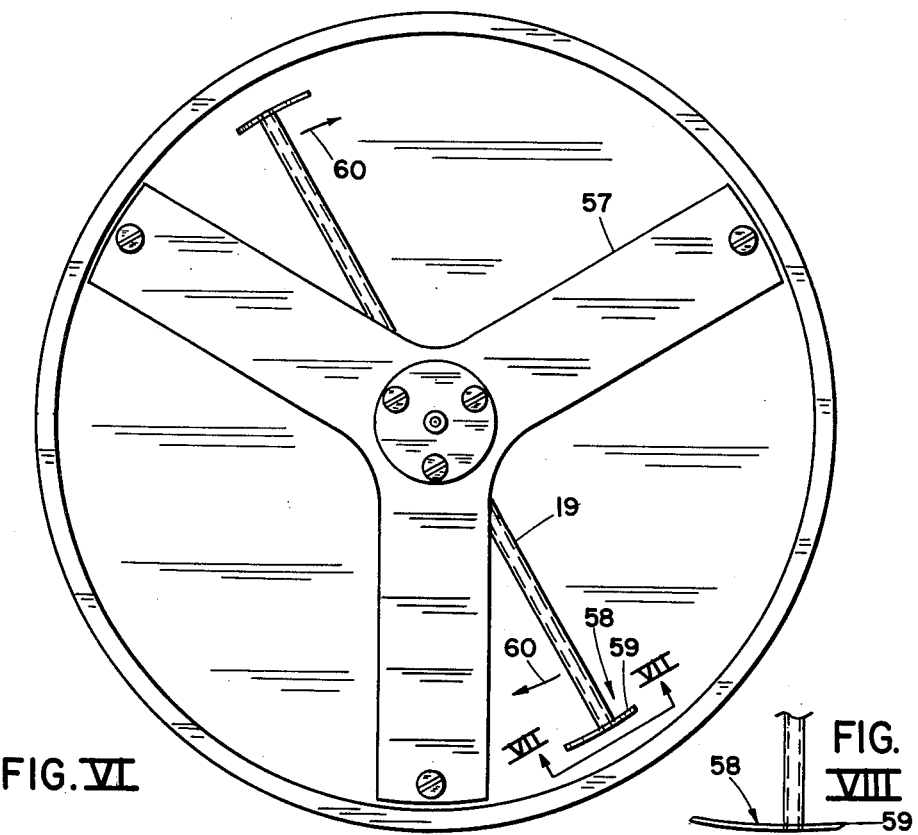
FIG. VI
FIG. VIII
FIG. VII
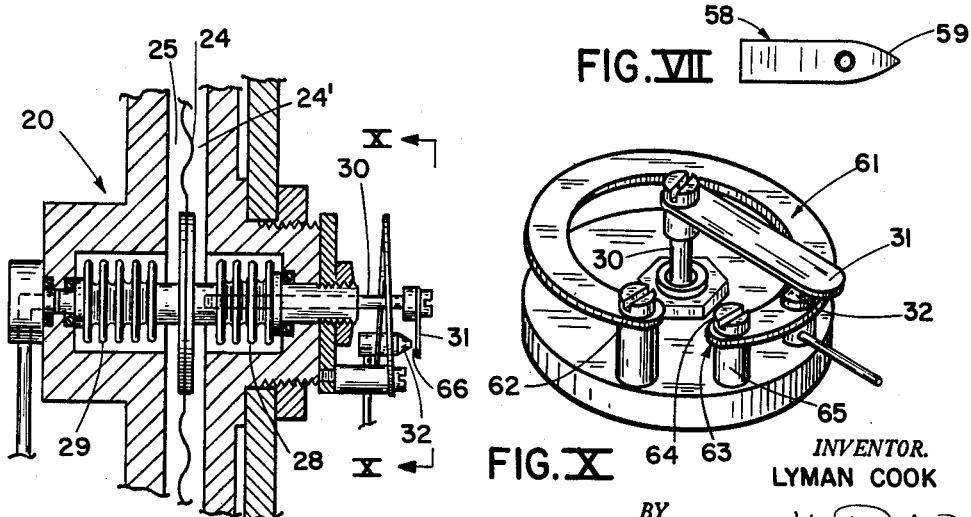
FIG. IX
FIG. X
INVENTOR.
LYMAN COOK
BY
Lawrence H. Poelton
AGENT

United States Patent Office 3,107,518
Patented Oct. 22, 1963

3,107,518
GAS SPECIFIC GRAVITY MEASURE
Lyman Cook, Foxboro, Mass., assignor to The Foxboro Company, Foxboro, Mass., a corporation of Massachusetts
Filed Jan. 18, 1962, Ser. No. 167,023
2 Claims. (Cl. 73—30)

This invention relates to the measurement of aeriform fluids, and has particular reference to means for measuring the specific gravity of gases.

Gas density measuring devices are systems which have been developed in many forms in the past. In order to fully delineate such a characteristic of a gas, it is necessary to measure in terms of specific gravity.

Specific gravity may be considered as the ratio of the density of a particular gas to the density of a selected reference, such as air. There is close association in the consideration of density and specific gravity measurements. The difference therebetween in function and apparatus is important and critical in the establishment of precise and accurate delineations of the exact character of the gas under consideration.

Specific gravity measurement of gas may be characterized as density measurement of gas, under controlled conditions. Ambient temperature, barometric pressure and compressibility are variants in exemplification of the necessity of control and the opportunities for error which are involved in density measurements and which necessitate control in specific gravity measurements.

This invention provides specific gravity measurement through the control of such variables, on an automatic basis, and with special structures and arrangements thereof.

This invention provides density measurement under automatic controlled conditions sufficient to establish specific measurement by an automatic, continuous maintenance of a controlled relation between the gas being measured and the actual temperature and barometric pressure ambiency variations.

It is therefore an object of this invention to provide a new and improved means for measuring the specific gravity of an aeriform fluid.

Other objects and advantages of this invention will be in part apparent and in part pointed out hereinafter, and in the accompanying drawings, wherein:

FIGURE I is a front elevation of a specific gravity measuring device according to this invention;

FIGURE II is a side elevation of the device of FIGURE I;

FIGURE III is a front elevation enlargement of the main body of the structure of FIGURE I, with the outer front cover removed;

FIGURE IV is a schematic illustration of the system embodied in the structure of FIGURES I–III;

FIGURE V is a fragmentary partial cut-away showing of the structure of FIGURE II in the area designated in FIGURE II as "V";

FIGURE VI is a view of the centrifugal impeller according to this invention, taken as generally indicated by VI—VI in FIGURE V;

FIGURE VII is an end view of the impeller taken as indicated by VII—VII in FIGURE VI;

FIGURE VIII is an enlargement of the end of the impeller of FIGURE VI;

FIGURE IX is a fragmentary sectional detail of the differential pressure device as indicated as IX in FIGURES IV and V; and FIGURE X is a perspective view of one end of FIGURE IX as indicated therein by X—X.

The various forms and details throughout the drawings are illustrative of a single system and structure. Like reference numbers are applied to like elements.

FIGURES I and II show the general form and appearance of a specific gravity measurement and indication instrument which is mounted on a base 10 through which the necessary electrical and pneumatic leads may be entered into the device (not shown).

The indicator 11 is a representation of the inner pressure of the case, that is, the pressure within the centrifugal impeller main housing as will be explained hereinafter. Further, in FIGURE I, a small dial is provided on either side of the case pressure indicator 11. Dial 12 provides a representation of supply pressure to certain pneumatic relays in the system as will be seen hereinafter. Dial 13 provides a representation of the input pressure of a sample gas going into the device. Actual representation of specific gravity is indicated on a specific gravity indicator separate from the device of FIGURES I and II and not shown therein but indicated for completeness of understanding in FIGURE IV as item 14.

In considering FIGURE II, the base 10 supports an electrical motor 15 for driving a horizontal shaft (not seen). The main impeller housing is shown at 16, and the various system devices are located in a frontal casing indicated at 17.

The FIGURE IV general overall schematic illustration of the system of this invention includes the electric motor 15 as shown with a shaft driven thereby as at 18. This shaft extends into the impeller housing 16. Mounted on the shaft 18 and transversely thereof, a centrifugal impeller tube 19 is provided. This tube is rotatable in the housing 16 about the motor shaft 18 in a horizontal plane as shown in FIGURE IV and in a vertical plane as it would be operated within the structure of FIGURE II. A continuance of the shaft 18 extends, in FIGURE IV, beyond the impeller tube 19 and into the differential pressure housing 20 which is located within the main housing 16 of the impeller tube.

An inlet hole 21 is provided at the midpoint of the impeller tube so gas may enter the impeller tube from the surrounding main housing containment. In the course of the rotation of the impeller tube by the motor 15, this incoming gas is centrifugally forced radially outward through the tube in both directions from the center of the tube, and out into the main housing. As a result, a partial vacuum is drawn in the area of the inlet opening 21 to the impeller tube. The degree of this vacuum as compared with the general pressure in the housing 16 is a usual measure of density of whatever gas is being thus treated. The differential pressure is taken as between the pressure in the partial vacuum area and the main housing pressure at a point removed from the vicinity of the spinning outer ends of the impeller tube, thus avoiding any turbulence or temporary high pressure variants.

The main housing 16 is supplied with sample gas from an inlet 22 and the gas is vented from the housing through a restricted outlet 23.

The differential pressure housing 20 is provided with a transverse diaphragm 24 to one side of which, as at 25, the low, partial vacuum, pressure from the center of the impeller tube, is applied through a lengthwise axial opening through the extension of the rotating shaft 18, as indicated at 26.

In the differential pressure housing, an opening 27 is provided from the interior of the main housing 16 to the high pressure side 24' of the differential pressure diaphragm 24.

The centrifugal impeller 19 is thus rotated within a casing full of sample gas and by means of a differential device, which is also within the same ambiency and actually within the main housing 16, the differental pressure of the impeller tube is determined as applied to opposite sides of diaphragm 24.

As means for taking off the differential pressure determination from the differential pressure device 20, equal sized, equal effective area bellows are utilized oppositely against each other through the diaphragm 24. In this opposition they comprise a sealing, open-to-atmosphere bellows 28, and a feed-back output pressure, bellows 29. The last bellows 29 is completely contained within the differential pressure unit 20 and within the main housing 16 and is in no way open to direct influences of ambient temperature or barometric pressure. On the other hand, in order to balance out any atmospheric condition effect on whatever usual form of indicator is provided as the specific gravity indicator such as 14, the first mentioned bellows 28 is open to atmosphere to establish atmospheric effects on the diaphragm 24 on the high pressure side of the differential pressure unit 20. This construction provides the advantage of complete enclosure of the feedback and output pressure bellows 29 without losing the necessary atmospheric condition balancing effect in that this balance is provided through the sealing bellows 28.

The motion achieved by the diaphragm 24 in representation of the differential pressure thereacross with respect to the high and low pressures of the impeller device is applied to a mechanical connection 30. This connection extends from the central portion of the diaphragm 24 through the open ended bellows 28 outwardly of the whole device. This action causes movement of a flapper 31 with respect to a nozzle 32 variably restricting the nozzle and consequently to vary the back pressure in the nozzle system through a pneumatic relay 33 back to the feedback bellows 29 as a balancing pressure for the differential pressure device. This balancing pressure is in fact the output pressure representative of the pressure differential and is available for application to the specific gravity indicator recorder 14 with further consideration for control conditions within the main housing 16 as will be explained hereinafter with respect to ambient conditions.

The feedback relay 33 utilizes a back pressure from the nozzle 32 to vary the supply from an air supply line 36 from a common supply 37 of above atmospheric pressure air. For example, this supply may be provided at 20 p.s.i. The same pneumatic supply through the pipe 37 is also extended through a pipe 38 to a second pneumatic relay 39 which provides a variant with respect to sample gas inlet through the pipe 22 as will be described.

The main housing case pressure of the housing 16 is an important factor in the operation of this device and the pressure level is kept in indication by the indicator 11 which is operable, for example, through an outlet 40 from the main case 16 to operate, in turn, a bellows 41, a linkage 42, and an indicator 43 in the general device 11 as shown also in FIGURE I.

An important part of this invention is the treatment of the sample gas inlet through the pipe 22. In the first instance, there is a general regulator at a selected level as shown at 44. This is used to bring a high line pressure down to a workable level, further controlled through the relay 39 and sample gas inlet valve 39'. The gas inlet flow is controlled in order to vary the condition of the gas within the housing 16 as necessary in terms of changes in the ambient temperature or barometric pressure. The inlet relay 39 and valve 39' operate in a selected sample inlet pressure range below that established by the regulator 44.

On the one hand, density measurement may be obtained simply by operating a centrifugal impeller and determining the differential pressure established thereby but there is no way of determining specific gravity by this simple arrangement. Specific gravity being density measured under controlled conditions and with a particular reference arrangement, it is necessary to provide means which take into account temperature and barometric pressure changes in the atmosphere of the overall device.

The fact that this is done in the system of this invention and the particular compact, efficient, and unique arrangement of parts within and with respect to each other is an important area of the present invention.

In this connection, a reference bellows 45 is mounted on the outside of the main housing 16 as a sealed bellows with a selected gas therein and open to whatever effect ambient temperature and barometric pressure may have upon it. The gas selected for containment in the reference bellows 45 may be taken as the expected average or mean of sample gas composition which may be under measure as desired or any of several other gases which are close enough in their related effects to the sample gas to give a practical operation to the device.

Also, outside of the housing 16 and mounted in opposition to the reference bellows 45 and with a pneumatic connection 46 to the interior of the main housing 16, there is a bellows 47 which is also exposed to atmospheric temperature changes and barometric pressure changes in the same immediate area as is the exposure of the reference bellows 45.

Relative motion between these opposed bellows 45 and 47 is established in a movable flapper arm 48 which moves to more or less restrict a nozzle 49 to the end that the back pressure from the nozzle 49 will operate the relay 39 in order to vary the operation of valve 39' in the sample gas input line 22 to vary the sample gas flow into the chamber 16 in accordance with the differential effect as between bellows 45 and 47.

In the event of a barometric pressure change in the ambiency of this device, whatever difference there might be in the effect of this pressure on the two bellows 45 and 47 is reflected in motion of the flapper 48 and variable restrictor of the nozzle 49 and variable sample gas input flow to the chamber 16.

Likewise, when there are ambient temperature changes, it is felt in the gas in the reference bellows 45 and a balance is provided in opposing pressure in the bellows 47.

A slight difference in effective areas of the bellows 45 and 47 may be established as a compensation factor for the compressibility characteristics of the gases.

FIGURE V illustrates detail of the assembly and mounting of the centrifugal impeller 19 on the motor 15 through the shaft 18 and shaft coupling 18' with a mounting sleeve 51 between the motor 15 and the main housing 16 of the impeller so that the impeller housing is pressure sealed off from the motor by a V-ring seal 52 held with angle brackets 53. The other end of the shaft coupling 18' is mounted in a ball bearing 54 and thus provides a coupling of the rotary member 18' with a fixed passage member 55 to provide passage from the rotating impeller arm 19 especially from the area of the entrance hole 21 thereto into the low pressure side 25 of the differential pressure unit 20. Sealing means in the form of an O-ring arrangement as at 56 is provided for sealing off the low pressure side 25 of the differential pressure unit. The shafting of the impeller tube 19 is mounted within the main housing 16 on a triple arm bracket 57 which is also shown in FIGURE VI and which provides a support for the centrifugal impeller 19.

In FIGURES VI, VII and VIII, details of the end of the impeller tube 19 are shown in the form of an arcuate shoe 58 mounted transversely on the end of the impeller tube 19 with a pointed end 59 in the trailing direction of travel as indicated by arrows 60 in FIGURE VI. Thus, with this shoe flow aiding device 58 on the end of the impeller tube 19, turbulence at this outer end of the centrifugal tube is substantially reduced to avoid pressure conditions which would be misrepresentative of the actual centrifugal situation of a particular gas through the tube.

FIGURES IX and X are detail showings of parts of the differential pressure unit 20 which may be understood with reference to the schematic of FIGURE IV and which illustrates the nozzle-baffle (31—32) arrangement wherein the nozzle 32 is mounted on an arcuate, almost circular flexible strip 61 with a fixed mounting at one end as at 62 and a vertically adjustable mounting at the other end as at 63. That is to say, under the spring force end arrangement of the nozzle support 61, it tends to hold itself up at 63 against the under side of the head 64 of the holding screw thereof. There is, however, some play between the head 64 of the holding screw and a supporting boss 65 therebeneath so that the end 63 of the member 61 may be moved vertically by adjustment of the screw 64 a substantial amount to vary the air gap as may be seen at 66 in FIGURE IX. This varies the nozzle-baffle restriction as a zeroing arrangement for this nozzle-baffle device. The reason for the length and shape of the nozzle support 61 is to provide a means of adjusting the nozzle away from the baffle 31 essentially in a straight line movement by turning the screw 64 on the basis of a long arm support so that while actually minutely arcuate, the adjustment movement of the nozzle 32 is sufficiently linear to maintain a suitable parallel air gap relationship between the end of the nozzle 32 and the under side of the flapper 31 as seen in FIGURES IX and X.

In the FIGURE III showing of the nozzle 49 adjustment may be made by use of a threaded sleeve 49' as a straight line motion. The showing of FIGURES IX and X is a matter of adaptation to that particular structure to provide effective operation in this specific arrangement.

This invention therefore provides a new and useful specific gravity measurement system with a compact and effective combination of a centrifugal impeller and a differential pressure takeoff device in association with automatic ambient temperature and barometric pressure compensation means.

As many embodiment may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:
1. A system for measuring the specific gravity of an aeriform fluid wherein said fluid is subjected to centrifugal force, said system comprising, in combination, a housing, a sample supply pipe for introducing said aeriform fluid into said housing and a vent outlet from said housing whereby the pressure in said housing may be controlled, means for controlling the general pressure in said housing in terms of ambient temperature and barometric pressure, said control means comprising a sealed, reference, gas filled bellows mounted outside of said housing, a housing pressure bellows opposing said reference bellows, a nozzle-baffle device operable by the differential force of said bellows, and valve means for varying the aeriform fluid flow through said sample supply pipe into said housing in response to the operation of said nozzle-baffle device, a centrifugal aeriform fluid impeller rotatable in said housing, and means for measuring the pressure differential set-up by said impeller, as a direct specific gravity measurement through density measurement under controlled conditions of the housing pressure with respect to ambient temperature and barometric pressure.

2. A system for measuring the specific gravity of a gas wherein said gas is subjected to centrifugal force, said system comprising, in combination, a housing, a sample supply pipe for introducing said gas into said housing and a vent outlet from said housing whereby the pressure in said housing may be controlled, a centrifugal tube in said housing, means for spinning said tube in said housing about an axis disposed transversely of said tube, a sample gas entrance to said tube in adjacency with the positional situation of said axis lengthwise of said tube, a differential pressure sensing unit, means for applying the internal pressure of said housing to one side of said pressure sensing unit, means for applying the low pressure of said centrifugal tube to the other side of said pressure sensing unit, a bellows operated nozzle-baffle device for compensating gas pressure in said housing with reference to ambient temperature and barometric pressure, said compensating device comprising a sealed, reference, gas filled bellows mounted outside of said housing, a housing pressure bellows opposing said reference bellows, a nozzle-baffle unit operable by the differential force of said bellows and valve means for varying the sample gas flow into said housing in response to the operation of said nozzle-baffle unit, and means for taking off an indication of the differential established in said pressure sensing unit as a density measurement of said gas under said compensation to provide a representation of the specific gravity of said gas.

References Cited in the file of this patent
UNITED STATES PATENTS

| | | |
|---|---|---|
| 2,035,039 | Adams et al. | Mar. 24, 1936 |
| 2,484,207 | Criner et al. | Oct. 11, 1949 |
| 2,535,202 | Gregory | Dec. 26, 1950 |
| 2,803,136 | Vetter | Aug. 20, 1957 |
| 2,847,850 | Spink | Aug. 19, 1958 |
| 2,964,938 | Fuller | Dec. 20, 1960 |
| 3,019,648 | Ruppert | Feb. 6, 1962 |
| 3,076,337 | Gehr | Feb. 5, 1963 |